(12) United States Patent
Restis

(10) Patent No.: US 9,300,124 B2
(45) Date of Patent: Mar. 29, 2016

(54) THERMALLY ISOLATING HERMETIC ELECTRICAL FEED-THROUGH

(71) Applicant: Thomas J. Restis, Buffalo Grove, IL (US)

(72) Inventor: Thomas J. Restis, Buffalo Grove, IL (US)

(73) Assignee: Durex International Corp, Cary, IL (US)

( * ) Notice: Subject to any disclaimer, the term of this patent is extended or adjusted under 35 U.S.C. 154(b) by 309 days.

(21) Appl. No.: 13/745,575

(22) Filed: Jan. 18, 2013

(65) Prior Publication Data

US 2014/0202764 A1    Jul. 24, 2014

(51) Int. Cl.

| | |
|---|---|
| *H01J 5/00* | (2006.01) |
| *H01J 15/00* | (2006.01) |
| *H05K 5/06* | (2006.01) |
| *H01R 9/05* | (2006.01) |
| *H02G 15/04* | (2006.01) |
| *H02G 15/013* | (2006.01) |
| *H02G 15/02* | (2006.01) |
| *H02G 15/08* | (2006.01) |
| *H05B 3/02* | (2006.01) |
| *H05B 3/06* | (2006.01) |
| *H05B 3/56* | (2006.01) |

(52) U.S. Cl.
CPC ............... *H02G 15/043* (2013.01); *H05B 3/06* (2013.01); *H05B 3/56* (2013.01)

(58) Field of Classification Search
CPC .......... H02G 3/02; H02G 3/025; H02G 3/04; H02G 3/043

USPC .... 174/74 A, 74 R, 75 C, 75 R, 77 R, 80, 82, 174/93; 338/240

See application file for complete search history.

(56) References Cited

U.S. PATENT DOCUMENTS

| | | | | |
|---|---|---|---|---|
| 1,177,392 | A * | 3/1916 | Dempster | 174/77 R |
| 2,043,196 | A * | 6/1936 | Finlayson | 174/50.56 |
| 2,169,570 | A * | 8/1939 | Ronci | 174/77 R |
| 2,527,890 | A * | 10/1950 | Pouchnik et al. | 174/77 R |
| 2,767,288 | A * | 10/1956 | Lennox | 174/102 R |
| 4,018,624 | A * | 4/1977 | Rizzolo | 136/233 |
| 5,161,894 | A * | 11/1992 | Bourigault | 374/185 |
| 5,536,478 | A * | 7/1996 | Lipp et al. | 174/102 P |
| 5,904,903 | A * | 5/1999 | Hotz et al. | 174/102 P |
| 5,917,150 | A * | 6/1999 | Hampton et al. | 174/50.56 |
| 7,439,845 | B2 * | 10/2008 | Houben et al. | 29/610.1 |
| 7,780,348 | B2 * | 8/2010 | Houben et al. | 374/185 |

* cited by examiner

*Primary Examiner* — Chau N Nguyen
*Assistant Examiner* — Roshn Varghese

(57) ABSTRACT

A moisture-sealing and thermally-isolating miniature implement for terminating a mineral-insulated and metal-sheathed cable and connecting it to a power source, includes a hollow contact prong protruding from one axial end of a metallic heat-sink barrel penetrated from an opposite end by the steel sheath of a heating element cable. The heating element contacts a nickel or nickel clad iron pin that penetrates the prong and is welded to its most distal extremity. The sheath is welded to the proximal end of the barrel by a hermetic brazed joint, and the distal end of the barrel is hermetically plugged around the prong by a metalized alumina ceramic seal. The copper pin is connected to the end of the heating element within the sheath and mineral insulation. The barrel is machined to have a series of deep peripheral grooves that act as thermal conductivity reducing chokes.

8 Claims, 2 Drawing Sheets

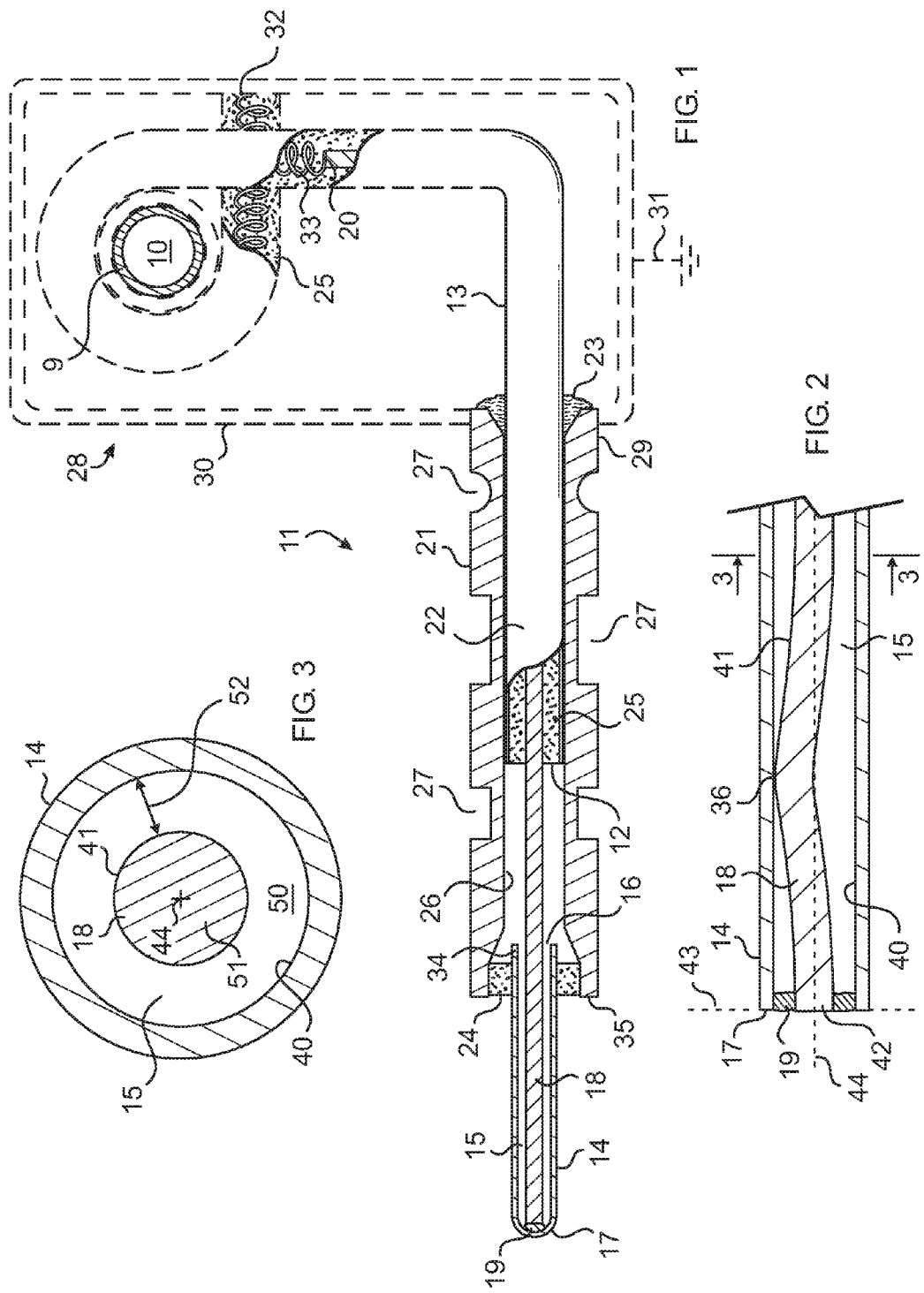

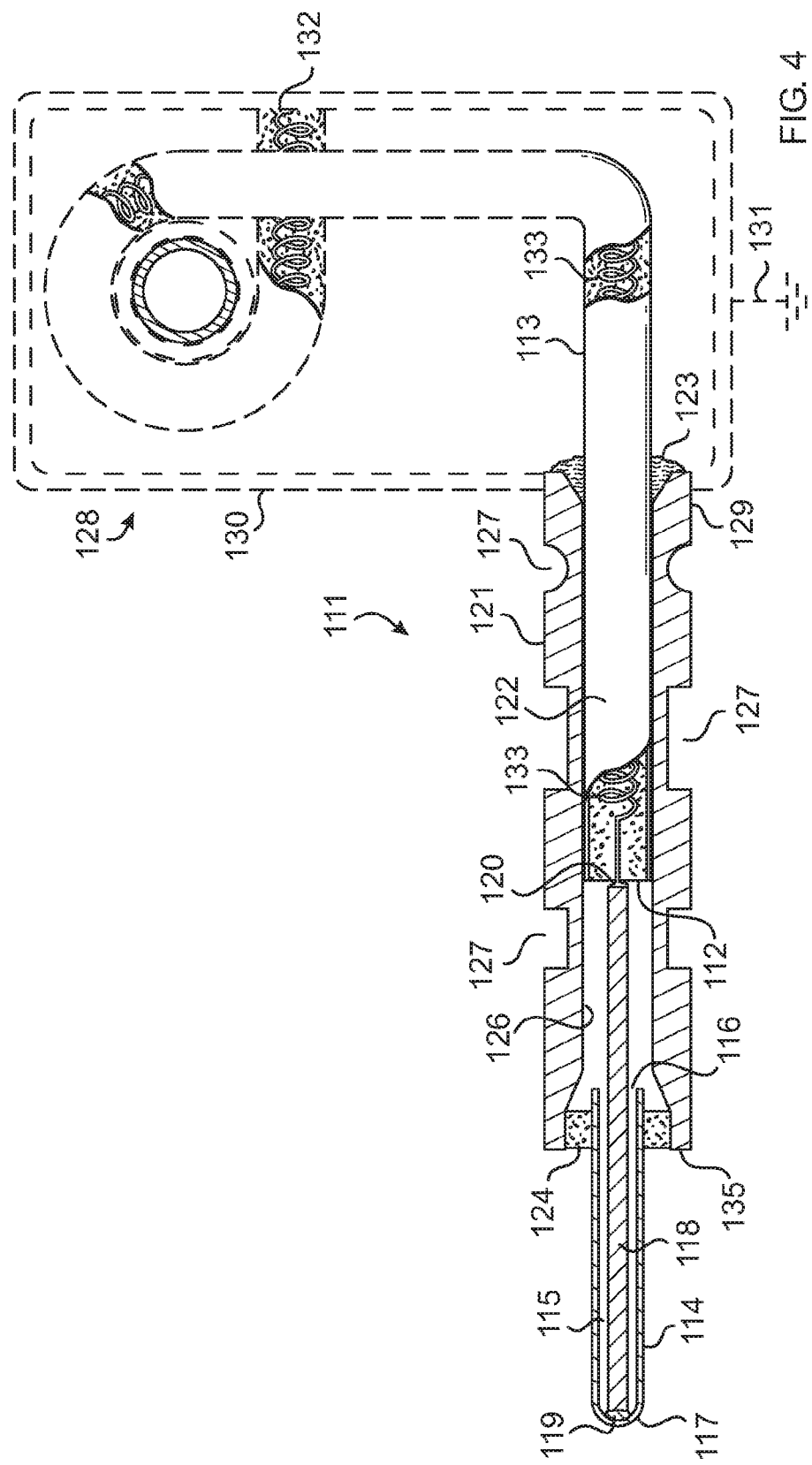

THERMALLY ISOLATING HERMETIC ELECTRICAL FEED-THROUGH

FIELD OF THE INVENTION

The invention relates to electrical cable termination and more specifically to thermally isolated, high temperature, mineral insulated conductors.

BACKGROUND

Many industries such as the telecommunication, chemical, pharmaceutical, microelectronic, construction and transportation industries require heated conduit lines for fluids. Some motor vehicles such as trucks and construction equipment in particular involve the need for heated fluid transmission lines especially for vehicles used in cold environments.

Electrically powered heaters have been used which include a metal-sheathed high temperature cable including electrical heating elements separated from the sheath by a mineral insulating material such as powdered magnesium oxide (MgO) or aluminum oxide ($Al_2O_3$). Due to the high porosity of the mineral insulator, the cable ends must be hermetically sealed against moisture, especially in a high temperature environment. Ceramic sealed terminations have been proposed to alleviate the risk of moisture seeping into the mineral insulator such as the one disclosed in U.S. Pat. No. 5,917,150 Hampton et al. However, this type of termination provides little thermal isolation to the termination, and is not particularly useful in joining the end of a mineral-insulated heating element to the prong of an electrical connector.

In miniaturized devices where the size of the conduit being heated can be as small as 1 millimeter and where distances are relatively short, heat isolation is very critical. There is a need to effectively and safely connect the end of a mineral-insulated small heating element to a source of electrical power. The instant invention results from efforts to provide an improved thermally isolating hermetic electrical feed-through which addresses one or more of the above problems.

SUMMARY

The primary and secondary objects of the invention are to provide an improved thermally isolating hermetic electrical feed-through. These and other objects are achieved by providing a hollow terminal prong through which extends a subsized electrical conductor.

In some embodiments there is provided a convenient means to connect the miniaturized end of a mineral-insulated and metal shielded cable, such as the extremity of a heater element, to a prong or other connecting terminal.

In some embodiments the junction between the end of the cable and the connection terminal is encapsulated into an elongated barrel sealed at its proximal end around the shield or sheath by a conductive braze joint, and is sealed at its distal end around the terminal prong by means of a ceramic barrier.

In some embodiments the terminal prong is hollow and engaged from its proximal aperture by a terminal at the end of the heating element or other active conductor.

In some embodiments there is provided a connection of a miniaturized cable under a high temperature environment.

In some embodiments there is provided a device for electrically connecting the end of a metal-sheathed heating element to a power source which comprises: a hollow prong having an anterior lumen; a conductive terminal at said end penetrating a proximal aperture of said lumen and being connected to a distal section of said prong.

In some embodiments there is provided a device which further comprises: a metallic, tubular heat-sinking barrel having a proximal end and a distal end, and an internal wall spaced-apart from, and surrounding said terminal and prong; and an electrically insulating ceramic plug sealing the distal end of said barrel around a proximal section of said prong; wherein said terminal comprises a pin having a distal end welded to a distal section of said prong, and said pin has a proximal end in contact with the end of said heating element.

In some embodiments there is provided a device which further comprises: a metallic sheath coaxially surrounding said heating element; a volume of mineral material insulating said heating element from said sheath; and, an hermetical brazing conductively joining said sheath to the proximal end of said barrel.

In some embodiments the barrel has at least one peripheral groove defining a thermal choke.

In some embodiments there is provided a device for terminating a mineral-insulated and metal-sheathed cable and providing a connection for a power source, which comprises: a metallic tubular barrel having a proximal aperture shaped and dimensioned to house an end of a metal-sheathed cable, and a distal aperture; a connecting prong partially engaged into said distal aperture; a stopple hermetically sealing said proximal aperture around said metal-sheathed end; and, a metalized alumina barrier sealing said distal aperture around said prong; wherein said barrier comprises a ceramic plug brazed with a high temperature alloy; said stopple comprises a brazed joint; and said prong is hollow, has a closed distal tip and a open proximal opening; and, said cable has a conductive terminal pin journaled into said prong through said opening and welded to said tip.

In some embodiments there is disclosed a method for manufacturing a thermally isolating an electrical terminator for a mineral insulated cable, said method comprises: journaling a conductive wire electrically contacting a heater element through a hollow electrically conductive prong; and, forming an electrical contact between said wire and said prong at a distal end of said prong, wherein said contact forms an hermetic seal of said prong.

The content of the original claims is incorporated herein by reference as summarizing features in one or more exemplary embodiments.

BRIEF DESCRIPTION OF THE DRAWINGS

FIG. 1 is a diagrammatical cross-sectional view of a cable terminal assembly according to an exemplary embodiment of the invention.

FIG. 2 is a diagrammatical partial cross-sectional view of the pin having an occasional contact with the inner surface of the prong.

FIG. 3 is a diagrammatical cross-sectional view of the pin and prong of FIG. 2 taken along line 3-3.

FIG. 4 is a diagrammatical cross-sectional view of a cable terminal assembly according to an alternate exemplary embodiment of the invention.

DESCRIPTION OF THE EXEMPLARY EMBODIMENTS

Referring now to the drawing, there is illustrated in FIG. 1 a device 11 connecting the end 12 of the metal sheathed electrically powered heating element cable 13 to an electrically conductive prong 14 suitable for insertion into an electrical outlet or extension cable end-connector to provide power to the heating element cable.

The prong 14 forms an hollow tube having an internal lumen 15 having an aperture 16 at its proximal extremity and a closed distal section tip 17. The heating element 33 terminates into a pin 18 which penetrates the prong proximal aperture 16 and extends through the lumen to the distal section 17 where it is welded at a weld joint 19 to the closed tip 17. The pin can be made of a length of nickel or nickel clad iron wire soldered, brazed or welded at a joint 20 to the heater element 33. The pin may also be constituted by a mere extension of the cable heating element wire that extends beyond the distal end 12 into the lumen 15.

The end of the heating element cable 13 and the proximal section 34 of the prong are journaled into a tubular heat-sinking barrel 21. A distal aperture at the distal end 35 of the barrel is hermetically closed around the prong 14 by a ceramic-to-metal barrier 24 made of metalized electrically insulating ceramic such as alumina, namely aluminum oxide, brazed with a high temperature alloy typically used to form an hermetic contact between metal and ceramic such as Alloy 720 (Bag-8) or similar material. The sheath 22 of the heating element cable can be made of stainless steel or another electrically conductive, high-temperature withstanding metallic material. The sheath extends into the barrel and is joined to its proximal end by a hermetical stopple 23 formed by a brazed joint. Accordingly, the inside of the barrel and the mineral insulator 25 of the heating element cable are protected against moisture which cannot penetrate the barrel from either end. Magnesium oxide (MgO) is preferably used as the mineral insulator. The inside wall 26 of the barrel is spaced-apart from the most proximal part of the prong and from the heating element cable terminal pin 18 to avoid electrical contact. Furthermore, there is a contiguous open space running from the gap in the lumen 15 through the proximal aperture 16 of the prong 14 to the inside wall 26 of the barrel 21.

As shown in FIGS. 2 and 3, the electrical link can be formed during manufacture between the terminal pin 18 and the prong 14 and can take place at the tip 17 of the prong and the distal extremity 42 of the pin by means of a weld joint 19. Both the tip and distal extremity can thus lie substantially within the same plane 43 substantially perpendicular to the elongation axis 44 of the prong. In this way the electrical contact between the tip and distal extremity of the pin can be conveniently manufactured and form an hermetic seal of the end of the lumen at the distal tip of the prong.

Thus, the prong 14 can be shaped and dimensioned to have an internal hollow substantially cylindrical lumen 15, defined by an internal substantially cylindrical sidewall surface 40, and the pin 18 can be shaped and dimensioned to have an outer substantially cylindrical sidewall portion 41 such that the outer diameter of the pin is smaller than the inner diameter of the prong. In other words, the pin diameter can be subsized with respect to the diameter of the lumen. In this way, during manufacture the pin can be journaled substantially coaxially through the lumen so that the pin is spaced a radial distance apart from the inner sidewall 40 of the prong, thereby providing a typically annular thermal isolation gap of a given thickness 52. In this way, the lumen 15 through the prong 14 would have an axially perpendicular cross-sectional area 50, greater than an axially perpendicular cross-sectional area 51 of the pin 18 taken co-locatedly at the same axial location.

Furthermore, as shown in FIG. 2, by shaping the lumen and pin to be substantially cylindrical, any contact 36 between the pin and the inner sidewall of the prong due to an occasional deformation of the pin will be minimized as to the surface area of the contact. Minimization of the contact surface area minimizes the transfer of heat from the pin to the prong thereby enhancing thermal isolation.

The pin can be made of a material of lower electrical resistivity than the heating element, such as nickel, nickel clad iron, or similar material to minimize heat generation inside the barrel.

The outside wall of the heat-sinking barrel 21 can be machined to create a series of peripheral grooves 27 that act as thermal chokes by providing thermal pathways having a smaller axial cross-sectional area.

The described device 11 can be used in connection an electrically powered heater 28, shown in dotted lines in the drawing, for high temperature heating of a pipe or tube 10 which can carry heated fluids such as liquids and gasses to vehicular system equipment. The heater includes a cast heater body 30 having a cylindrical passageway 9 through which the tube to be heated intimately passes. The body contains the coiled electrically powered heating element cable 13 surrounding the passageway.

The barrel 21 has its proximal end 29 joined to the metallic housing 30 of the heater which is grounded 31 and provides a ground return for the proximal end 32 of the heating element. The heating element sheath may have a diameter as small as 1 millimeter. The heat output of the heater can be as high as 650° C.

In this way it can be understood that the high temperature environment and the small size of the device would preclude using the prior art terminations disclosed in the above referred patent. Further the disclosed termination is readily scalable to even smaller geometries.

Referring now to FIG. 4, there is shown an alternate exemplary embodiment of a device 111 similar to the device shown in FIG. 1 but where the heater element cable 113 has a heating element 133 which extends substantially the entire length of the cable and thus into the barrel structure 121. The conductive pin 118 has a distal end electrically connected at a weld joint 119 to the distal section tip 117 of the hollow conductive prong 114. The pin extends through the central lumen 115 of the prong spaced apart from the inner side wall of the prong, through the prong's proximal aperture 116 and through the barrel 121 in absence of an intended electrical contact to the inside wall 126 of the barrel. The proximal end of the pin terminates at a soldered, brazed or welded joint 120 electrically contacting the distal end 112 of the heating element 133. A ceramic-to-metal barrier 124 hermetically and electrically insulatingly seals the distal end 135 of the barrel to the prong 114. The sheath 122 of the heating element cable 113 electrically conductively joins to the barrel at its proximal end 129 by a hermetical stopple 123 formed by a brazed joint. Peripheral grooves 127 form thermal chokes in the barrel.

The described device 111 can be used in connection an electrically powered heater 128, similar to the embodiment of FIG. 1 having a cast heater body 130 joined to the barrel 121 at its proximal end 129 which is grounded 131 and provides a ground return for the proximal end 132 of the heating element.

In the embodiment of FIG. 4, although there can be less thermal isolation, manufacturing can be less expensive by avoiding the running of the cold pin through the cable as in the previous embodiment and instead using an unadulterated, common, off-the-shelf heater element cable design.

While the preferred embodiment of the invention has been described, modifications can be made and other embodiments may be devised without departing from the spirit of the invention and the scope of the appended claims.

What is claimed is:

1. A device which comprises: a hollow prong having a lumen; a conductive terminal at said end loosely penetrating a proximal aperture of said lumen and being connected to a distal section of said prong forming a gap between said prong and said terminal; a metallic, tubular heat-sinking barrel having a proximal end and a distal end, and an internal wall spaced-apart from, and surrounding said terminal and prong forming an open space running from said gap through said proximal aperture to an inside wall of said barrel; wherein said barrel has at least one peripheral groove defining a thermal choke proximal to said inside wall; an electrically insulating ceramic plug hermetically sealing the distal end of said barrel around a proximal section of said prong; a metallic sheath coaxially surrounding said heating element; a volume of mineral material insulating said heating element from said sheath; and a hermetical stopple conductively joining said sheath to the proximal end of said barrel.

2. The device of claim 1, wherein said terminal comprises a pin having a distal end welded to the distal section of said prong.

3. The device of claim 2, wherein said pin has a proximal end in contact with the end of said heating element.

4. A device for terminating a mineral-insulated and metal-sheathed cable and providing a connection for a power source, which comprises:
   a metallic tubular barrel having a proximal end shaped and dimensioned to house an end of said metal-sheathed cable, and a distal end;
   a hollow connecting prong having a lumen, a closed distal tip and a proximal aperture, said prong partially engaged into said distal aperture;
   said cable having a conductive terminal pin journaled into said prong through said proximal opening and welded to said tip;
   said terminal in having a subsized diameter with respect to said lumen forming a gap therebetween;
   said barrel including an internal wall spaced-apart from, and surrounding said terminal pin and prong forming an open space running from said gap through said proximal opening to said internal wall of said barrel;
   said barrel having at least one peripheral groove defining a thermal choke proximal to said internal wall;
   a stopple hermetically conductively sealing said proximal aperture around said metal-sheathed end; and,
   a metallized alumina barrier sealing said distal aperture around said prong.

5. The device of claim 4, wherein said barrier comprises a ceramic plug brazed with a high temperature alloy.

6. The device of claim 5, wherein said stopple comprises a brazed joint.

7. A device for thermally isolating an electrical terminator for a mineral insulated cable, said device comprises:
   an electrically conductive metallic tubular barrel having a distal end spaced apart from a proximal end, an inside wall, and at least one peripheral groove defining a thermal choke proximal to said inside wall;
   an electrically conductive contact prong comprising a proximal section and a distal section;
   said prong being shaped and dimensioned to have an internal hollow lumen, defined by an internal sidewall surface;
   an electrically conductive wire extending through said lumen;
   said wire comprising:
      a portion radially spaced apart from said surface thereby forming a gap;
      and,
      a distal extremity;
   an open space running from said gap to said inside wall;
   an electrically conductive seal, hermetically sealing said lumen at said distal section and electrically contacting said distal section to said distal extremity.

8. The device of claim 7, which further comprises:
   said lumen having a first cross-sectional area larger than a co-located second cross-sectional area of said wire.

* * * * *